United States Patent [19]
Frieling

[11] Patent Number: 5,857,028
[45] Date of Patent: Jan. 5, 1999

[54] COMPUTER ACCESS CONTROL BY FINGER ANATOMY AND COMPREHENSION TESTING

[76] Inventor: Edward Frieling, 5670 Willow Creek Ct., Delray Beach, Fla. 33484

[21] Appl. No.: 856,758

[22] Filed: May 15, 1997

Related U.S. Application Data

[63] Continuation-in-part of Ser. No. 584,306, Jan. 11, 1996, abandoned.

[51] Int. Cl.$^6$ .................................................. G06K 9/00
[52] U.S. Cl. ............................. 382/116; 283/68; 283/78; 382/126
[58] Field of Search ................................. 382/124, 125, 382/126, 127, 115, 116; 283/68, 78

[56] References Cited

U.S. PATENT DOCUMENTS

| | | | |
|---|---|---|---|
| 3,576,537 | 4/1971 | Ernst | 340/149 |
| 3,576,538 | 4/1971 | Miller | 340/149 |
| 3,585,594 | 6/1971 | Schwend | 340/149 |
| 3,614,737 | 6/1972 | Sadowsky | 340/146.3 E |
| 3,648,240 | 3/1972 | Jacoby | 340/146.3 E |
| 3,668,633 | 3/1972 | Sadowsky | 340/146.3 E |
| 3,721,128 | 3/1973 | Thurman | 73/432 R |
| 4,107,775 | 8/1978 | Ott | 364/413 |
| 4,357,597 | 11/1982 | Butler | 340/146.3 E |
| 4,486,180 | 12/1984 | Riley | 434/65 |
| 4,537,484 | 8/1985 | Fowler et al. | 354/62 |
| 4,669,487 | 6/1987 | Frieling | 128/774 |
| 4,720,869 | 1/1988 | Wadia | 382/115 |
| 4,736,203 | 4/1988 | Sidlaukis | 340/825 |
| 5,073,949 | 12/1991 | Takeda et al. | 382/115 |
| 5,073,950 | 12/1991 | Colbert | 382/2 |
| 5,177,802 | 1/1993 | Fujimoto et al. | 382/124 |
| 5,193,855 | 3/1993 | Shamos | 283/117 |
| 5,335,288 | 8/1994 | Faulkner | 382/4 |
| 5,341,291 | 8/1994 | Roizen et al. | 364/413.02 |
| 5,369,704 | 11/1994 | Bennett et al. | 380/9 |
| 5,408,536 | 4/1995 | Lemelson | 382/2 |
| 5,412,738 | 5/1995 | Brunelli et al. | 382/115 |
| 5,546,471 | 8/1996 | Merjanian | 382/124 |

*Primary Examiner*—Joseph Mancuso
*Assistant Examiner*—Jayanti K. Patel
*Attorney, Agent, or Firm*—Alvin S. Blum

[57] ABSTRACT

A system for controlling access to a computer and for verifying informed consent in medical procedures includes a finger anatomy analyzer for verifying identity of a person. The analyzer generates a pattern of finger width vs length along the surface of the finger. The pattern generated is compared to a stored pattern to verify identity. To verify that the identified person is giving informed consent or denial to a medical procedure, the person is provided with the appropriate information and test questions given and answers recorded as evidence of comprehension to serve as evidence of informed consent or denial in combination with verified person identification.

5 Claims, 3 Drawing Sheets

COMPUTER ACCESS CONTROL BY FINGER ANATOMY AND COMPREHENSION TESTING

This application is a continuation in part of U.S. patent application Ser. No. 08/584,306 filed Jan. 11, 1996 now abandoned.

BACKGROUND OF THE INVENTION

This invention relates to systems for controlling access to a computer and more particularly to verification of a person's identity by a finger anatomy detector in combination with means ensuring that the identified person has comprehended information conveyed before access is granted.

There are many situations in which it is necessary and/or desirable to verify that a particular person has permission to access, enter, or modify medical or other data in a computer environment. Although data may be entered and changed with the proper authority, medical records must have a trace system to track alterations to data. The date and time must be unalterable and traceable, along with the original data and the changed data, and who made the change. An electronic and/or a mechanical signature, based on State Law, must verify the identity of the responsible party.

An optional digital color or black and white photograph and an electronic signature stored in a computer or a mechanical signature may verify the identity of the individual giving the authorization.

Other methods have been used to verify the identity of the person seeking computer access. These sometimes involve code words, code numbers, and body characteristics such as fingerprints. Fingerprint systems are identifiers rather than verifiers and are expensive to purchase. They require an inordinate amount of memory storage compared to the system described herein. In Ernst U.S. Pat. Nos. 3,576,537, Miller 3,576,538, Schwend 3,585,594, Jacoby 3,648,240, Thruman 3,721,128, for example, the length of an individual's finger along its longitudinal axis is measured and used as a test of personal identity for credit card authorization purposes. In Frieling U.S. Pat. No. 4,669,487 thickness of the knuckle and the linear distance between the knuckles is used for verification of identity for credit card identity.

These systems can be quite costly and complex to implement.

INFORMED CONSENT IN MEDICAL PRACTICE

Positive identification of a person prior to computer access resolves some issues, but still leaves some issues concerned with informed consent in medical practice unresolved.

A verified signature approving or denying a medical procedure does not verify for the record that the persons understood the information that was conveyed and used to make their decision.

To avoid potential legal problems such as claims of failure to warn or inform of potential risks of doing or not doing a procedure or administration, it would be useful to have a system that ensures that the persons giving consent do understand the information conveyed and that makes a record thereof. This would also benefit the patient by systematically ensuring that the medical decisions resulted from informed consent.

SUMMARY OF THE INVENTION

It is, accordingly, an object of the invention to provide a system for controlling access to a computer that includes a finger anatomy detector that is simple and inexpensive to implement.

It is another object of the invention to provide a means for ensuring that when an approval is given by the patient or the parent or legal guardian of a child or an adult with legal custodial rights for medical or other procedure, that the approver comprehends what approval is for and the consequences of action or failure to act.

The finger anatomy detector comprises a pair of rollers between which the finger is passed. A first roller has a fixed axis and a second roller has a movable axis spring biased toward the first roller. As the finger moves past the rollers, the first roller rotation reflects distance along the surface of the finger. An electrical indication of this roller rotation is generated by the first roller.

As the finger moves past the rollers, the second roller moves toward and away from the first roller as the finger thickness decreases and increases as the knuckles pass between the rollers. An electrical indication of this second roller movement is generated.

The simultaneous generation of two signals, one indicating distance along the finger surface and the other the width of the finger at every distance along the finger surface are combined to yield a unique finger anatomy pattern.

The patterns generated by one or more fingers of a person are stored in the computer with a person's identity. When persons attempt access to the computer, their finger pattern must match the stored pattern or patterns to gain access. Various pattern matching methods well known in the art may be used for this purpose.

The mechanical device can also be used at the time of surgery or other procedure to verify that they are the correct person who authorized the procedure for themselves or had the procedure authorized for them by another person.

To avoid potential legal problems such as claims of failure to warn or failure to properly inform of potential risks, the invention includes a method for determining the most proficient language of the person, then gives the choice of this or other languages. The information is then presented in written and/or audible form in their language of choice. If the person failed to fully understand the information, they may have it repeated in another language or have the option of having it explained to them before giving their approval. The use of questions and the person's correct answers to these questions establish that their comprehension was adequate to understand what they were giving approval for. It further proves that they were aware of the potential consequence of performing the medical procedure or of taking the risks of denying the approval. An electronic signature and/or a mechanical signature verifies that they are the person who was properly alerted to all pertinent factors before making their decision and are the duly authorized person to approve the procedure for the patient identified as the one to have the procedure performed.

These and other objects, advantages and features of the invention will become more apparent when the detailed description is studied in conjunction with the drawings, in which like reference characters indicate like elements in the various figures.

DETAILED DESCRIPTION OF PREFERRED EMBODIMENTS

Figure 1:
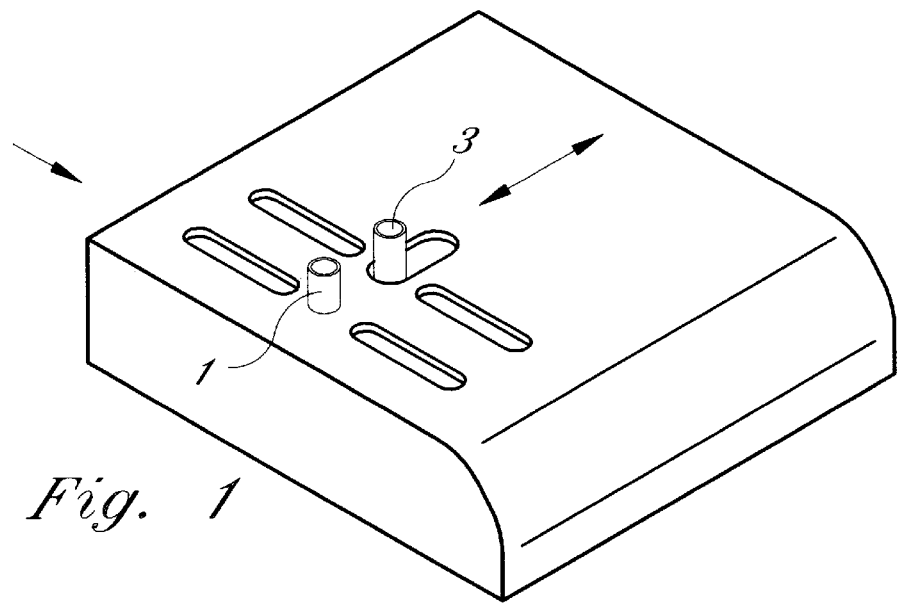
FIG. 1 is a perspective view of the finger anatomy analyzer.
Figure 2:
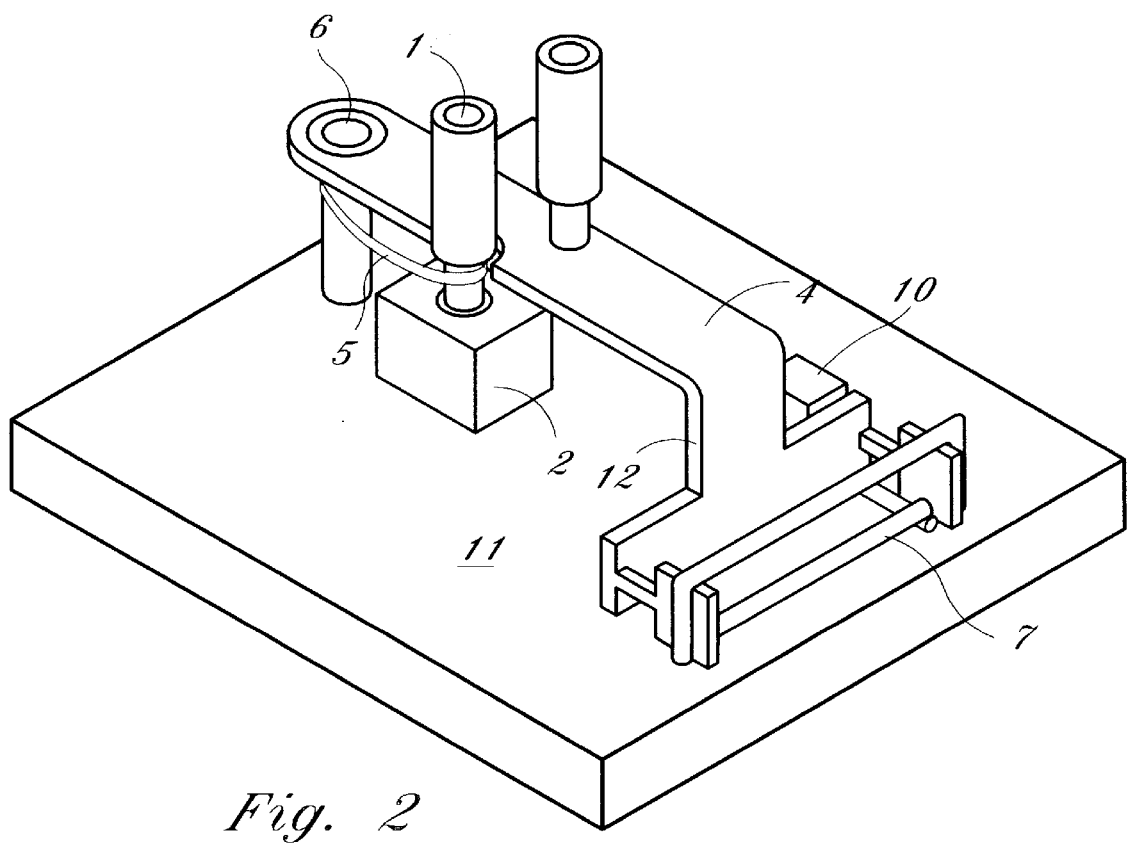
FIG. 2 is a perspective view of the finger anatomy analyzer with cover removed.
Figure 3:
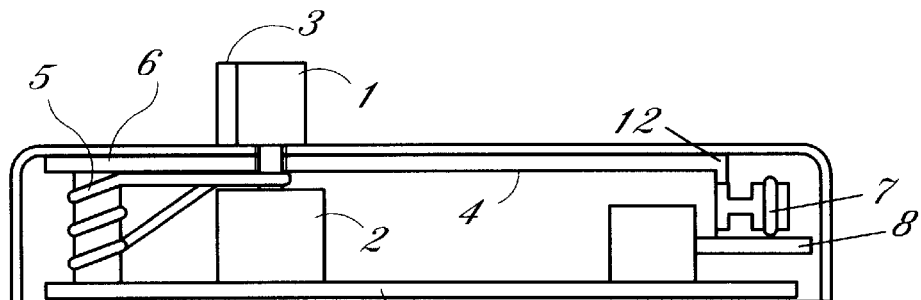
FIG. 3 is a side elevation view of the finger anatomy analyzer with side cover removed.
Figure 4:
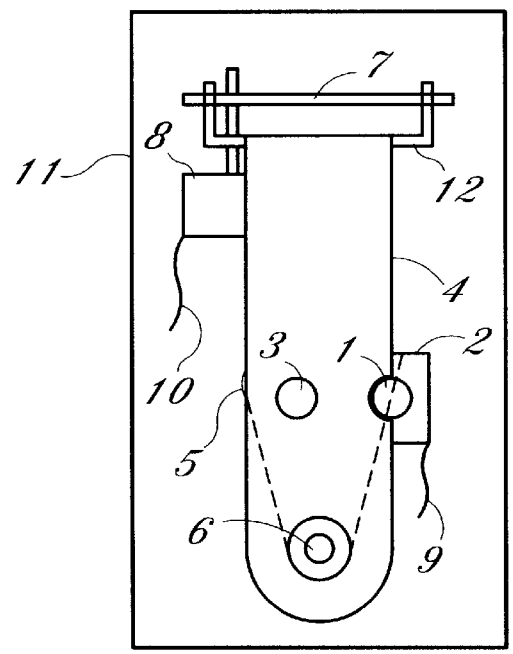
FIG. 4 is a top view of the finger anatomy analyzer with cover removed.

The present invention employs an electromechanical measuring device to determine the shape of portions of one or more fingers. In one option requiring the minimum amount of stored data, the shape is defined as the best mathematical curve fit, such as a parabola, for each knuckle joint on one or more fingers plus a calculated error between the simulated mathematical fit and the actual measurements. An alternate option, requiring more memory space, would record a large number of dimensions defining the actual shape of a significant portion of one or more fingers.

THE FINGER ANATOMY ANALYZER

The analyzer comprises two rollers between which a finger is passed. A first roller 1, rolling about a stationary vertical axis, is coupled to a rotary optical encoder 2. As the finger moves in contact with the roller, the surface distance along the finger is translated into rotary motion of the roller and 512 output signals emitted from encoder 2 at output 9 per roller revolution.

A second roller 3 is rotatably mounted on elongate arm 4 to rotate about a vertical axis. Arm 4 is pivotally mounted at pivot 6 to base 11. Roller 3 is spring biased toward roller 1 by spring 5 on arm 4, so as to press against a finger inserted between the rollers, forcing it toward roller 1. As a thicker portion of the finger enters the space between the rollers, arm 4 is moved away from roller 1. The free end 12 of the arm 4 has an "O" ring 7 stretched across it to form a horizontal belt which frictionally engages the second rotary optical encoder 8 which generates signals at output 10 in correspondence to the amount that arm 4 is moved as the thickness of the finger changes at the space between the rollers. The output of the two encoders at outputs 9 and 10 is then a digital representation of the shape of the finger passing through the rollers. The information is processed and then used by a computer on the device or by a remote computer to verify the identity of a person by comparison to data previously recorded.

Figure 5:
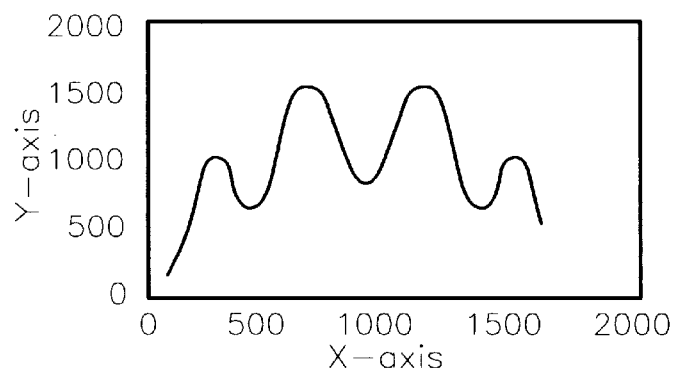
FIG. 5 is a graph produced from the data generated by the finger anatomy analyzer.

FIG. 5 shows a plot of data from the passage of a finger through the device with surface distance on the X axis and width on the Y axis.

FINGER DATA PROCESSING

Having X-Y coordinates of the finger shape from the data obtained when the finger was passed between the rollers, one procedure, which utilizes a minimum amount of stored identification data, is to simulate the knuckle peaks by least square fit parabolas. After the best fitting parabola is determined for each peak by calculating the one with the least error to the original data, the coordinates of the peaks are recorded and the amount of the error. A good method of defining the error is to take each error point, square it, assign a plus or minus sign to it based on the direction of the un-squared error, then add up all the signed squared errors and take the square root.

One identifying number to record for use in the identification process, is determined by calculating the difference in the height of two simulated parabola peaks between adjacent knuckles. A second reference number is determined from the measured surface length distance between the knuckle peaks as defined by the distance between the parabola peaks. The repeatability depends on the fact that the peaks generated by a mathematical curve such as a parabola will be in the same location for the same finger shape regardless of the quality of the fit of the mathematical curve to the actual knuckle shape. A third number is the error number calculated which defines how far off the mathematical fit is from the actual data. Thus a very odd shaped finger must have a large error in addition to meeting the distance between peaks and difference between knuckle thickness criteria.

This method is used to minimize the amount of recorded data and consequential cost of memory with minimal loss of accuracy. One or more fingers can be used based on the required accuracy and the amount of memory storage allocated. The system avoids the need for calibrating the machine by zeroing the analogue to digital converters or accurately adjusting the spring pressure on the rollers pressing against the finger under measurement. A nominal change in spring pressure will flatten the knuckles slightly more or less. The difference in thickness of 2 knuckles caused by a slight change in compression on the two knuckles will tend to cancel each other because their height, (thickness), measurements are subtracted giving the same difference as if they weren't flattened. Any increase in pressure on the larger joint caused by a decrease in the temperature of a spring or the use of a different machine will cause a reduction in its width while the smaller joint will experience approximately the same decrease in width because it experiences less pressure change due to the same spring being less stretched as a consequence of the mechanics of the machine.

A slightly increased flattening of the peaks caused by an increase in the spring tension as discussed above, may move the actual peaks slightly but will not significantly move the peaks of the mathematical parabolas representing the basic shape of the peak and is thus only slightly influenced by the actual peaks.

The effect of gradual changes in finger shape due to aging or medical deformation are reduced by making small adjustments in the reference numbers every time the device is used. A percentage of the difference between new acceptable numbers and the reference numbers is used as a gradual error corrector making a slight adjustment to the reference numbers for the next usage.

The system eliminates short term variations due to daily fluctuations by using the difference of peaks rather than the height of the peaks. The thickness of the knuckle joints track very closely on the same finger during daily activity including, for example, playing tennis, when the joints fatten up significantly.

Four peaks are determined from the raw data created by sliding a finger both in and out of the device between a set of rollers. This gives duplicate measurements of the same finger which may be compared with each other and used to verify that the motion of the finger was smooth both in and out. (Substantially similar results is evidence that the measurements were not made with a twisting finger motion). The two sets of data consisting of the first two peaks and the second two peaks, can be used independently giving additional data for establishing an identity.

Various means of curve fitting and pattern matching well known in the art may be employed to match the input finger anatomy date to previously stored data and need not be discussed herein.

The data normally recorded on installing a new user includes:

Name and title

An ID number such as social security number, birthday, mother's maiden name, wife's mother's maiden name, etc.

Hand Used, Finger Used. (Up to 6 inputs RM-right middle finger, RI-right index, LI-left index, LM-left middle, RR-right ring, LR-left ring.

The data for each finger entered is: distance between joints, between knuckle peaks, error reading for fit.

These three readings are used to decide the validity of applicant to access computer and the level of authority or which patients data can be accessed.

An alternate more accurate approach requiring more memory storage area involves documenting the entire finger shape with a resolution determined by how many of the measured points are used.

The acceptable level for acceptance is established by a compromise between probability of rejecting a valid person versus the possibility of accepting an invalid person.

MEDICAL RELEASE FOR A PROCEDURE COMPUTER VERIFIED COMPREHENSION (1) A client (commonly referred to as patient) or their legally authorized guardian who can act on behalf of client, is seated in front of a computer terminal display equipped with earphones or a loudspeaker and may have a microphone.

(2) Verification is performed that the person is indeed the purported person who will be receiving the procedure or the duly authorized person to give the approval and assume responsibility for the authorization.

---

(1) Name of person who will undergo procedure:_____
    Address:_____
    Approximate date that procedure will be performed_____
    Birth Date:_____
    ID #_____ SS #_____
    Verification used:_____
(2) Name of procedure_____
(3) Short reason for procedure_____

(4) Signature* of Dr. recommending procedure_____
                                          Name_____
(5) Signature* of Dr. #1 confirming need for procedure_____
                                          Name_____
(5) Signature* of Dr. #2 confirming need for procedure_____
                                          Name_____

---

*may be electronic signatures in states where they are legal.

Attendant brings up entry screen by typing MRP from "C" or other hard disc.

Attendant asks client/guardian for a language they are fluent in or has them speak into microphone reading a sentence from screen #1 in their native tongue so that speech pattern can be used to determine most probable language if difficulty occurs communicating with them. Continue on if their language is available in language library as per screen #1.

First screen appears to help select a language

| (7) Language | Sentence | Instruction | |
|---|---|---|---|
| English | I speak English | press | (1) |
| French | Je parle Francais | presser | (2) |
| German | Ich sprechen Deutch | drucken | (3) |
| Italian | Io pariare Italien | premere | (4) |

-continued

| (7) Language | Sentence | Instruction | |
|---|---|---|---|
| Spanish | Yo hablar Espagnol | apretar | (5) |
| Swedish | Yag tala Svedois | presse | (6) |
| Yiddish | Ikh redn Yidish | drikn | (7) |

(8) A number may be selected by pressing that number (without enter key), by use of touch screen, or by speaking into microphone. If number is selected, Go to (9). If client/guardian reads none of the languages offered, the client must bring in a translator to translate on their behalf. If this occurs, fill in the following

---

Information on client/guardian translator
Name:_____
Relationship_____
Address:_____
Verification of identity used: Driver's license_____
                              Soc. Sec. Card_____
                              Other_____
I_____ as translator for
_____ who is the client or guardian
certify that_____ understood all the
information mentioned in this document _____  _____
    Attestor                    Witness
in selected language
(9) "Are you sure that this is your best language" (Y) if keyed or
"YES" if spoken (N) if keyed or "NO" if spoken
(10) if (Y) was selected go on to (11), else go back to language
selected (7) for a new choice.
(11) You have indicated that you can understand "_____"
(choice in tongue used). Is this correct? Pick YES OR NO  YES(Y)
NO(N), The following words appear on screen and are spoken slowly
to client/guardian in language of choice.

--- in selected language (9) "Are you sure that this is your best language" (Y) if keyed or "YES" if spoken (N) if keyed or "NO" if spoken

(10) if (Y) was selected go on to (11), else go back to language selected (7) for a new choice.

(11) You have indicated that you can understand "_____" (choice in tongue used). Is this correct? Pick YES OR NO YES(Y) NO(N). The following words appear on screen and are spoken slowly to client/guardian in language of choice.

"This is a Refusal Form or Consent Form for a medical procedure. You must make your own decision based on the information made available to you. This is an attempt to provide that information by your physicians and/or hospital staff. All procedures have varying degrees of risk which is the reason for these elaborate measures to insure that you make a decision after you are aware of the important facts and important risks of both having the procedure performed or taking the risks of refusing the procedure.

You and you alone must make the final decision! You may change your mind or revoke your decision at any time until the Procedure has begun. If you are awake during the procedure, you may request that the procedure be discontinued at any time during the procedure unless such action will be detrimental or dangerous to your well being or survival.

(12) This release specifically does not release any particular doctor or other individual or group of individuals from the results of an error whether intentional or accidental."

(13) The following information is provided with one or more questions that will be answered by the client/guardian to show understanding of the explanation.

1. Reason that the procedure is recommended.
2. Description of procedure.
3. Potential risks if procedure is performed.
4. Potential risks if procedure is postponed or refused.

(14) The procedure is scheduled to be performed by Dr. _____ who is qualified to perform this procedure.

In the event that Dr._____ cannot perform or complete the procedure for medical reasons, such as he has a heart attack, or other reasons as determined by the doctor, you recognize that a duly qualified alternate physician may be substituted at any time including the period during the procedure or prior to the beginning of the procedure.

If Dr._____ cannot start the procedure as scheduled
(select A or B)

(A) I do not want the procedure to start and I desire to have it rescheduled.

(B) I want the procedure to be carried out with another Doctor skilled to perform the procedure.

SAMPLE QUESTION

Answer the following question to show understanding of what you have heard and/or read. Select the best answer.

"Does your physician have to complete the procedure under all conditions and circumstances?"

If the answer is YES press (Y) or say "YES"

If answered YES, "Are you sure the answer was YES?" Answer YES (Y) or NO (N)

If answer is NO press (N) or say "NO"

(15) During the procedure there are assistants selected by the Doctor or Hospital. The Doctor is responsible for the procedure and is in total charge including selection of the Anesthetist.

(16) There will be one multiple choice question after (13) 1-2-3-4 which the client must answer. They may be assisted in understanding the question.

(17) I have a question on (1) (2) (3) (4)

I understand the reason for the procedure, the Risks involved, and have had all my unanswered questions answered by
Dr._____

Client/Guardian signature*      Witness signature*.      Date

Typical Question for a Stress Test

Certain things can occur during the test. Pick the most correct answer.
A. My cholesterol level can change.
B. My white cell count can become excessive.
C. Erratic and rapid heart rate can occur.
D. A stomach ulcer can occur.
E. I may develop meningitis.

Questions asked of client/guardian by physician, nurse or other representative, or asked by the computer, on screen or out loud.

1. Do you know of any reason including former or current illnesses, allergies to medications or anesthesia, blood condition, any drugs or medications you are taking or any other reason why this procedure should not be performed?
2. Are you now taking any medications or drugs? If so, what are they?
3. Are you now or have you ever been a (A) smoker (B) drug user (C) alcoholic
4. Do you have any questions about why we are recommending this procedure?
5. Do you have any unanswered questions about possible consequences of not going ahead with the procedure?
6. Do you have any questions about possible consequences of doing the procedure?
7. Do you understand the procedure?

Record all questions answered Yes and record the answers given to the client/guardian and their response.

The following elements enhance the validity of the comprehension of the information related to the consent:

1. Use of multilingual options to optimize comprehension of the Release Form.
2. Use of interspersed questions and required responses to ensure comprehension of the information by the client/guardian.
3. Use of automated determination of primary language by analysis of speech pattern.
4. Elimination of failure to inform clearly of dangers of a medical procedure for use in potential malpractice law suits by confirmation of understanding using feedback from client/patient, and keeping a record of same.
5. A method of selecting primary language of maximum familiarity by asking questions in various languages until correct responses are given.
6. The concept that the medical release form is equally a refusal form to ensure freedom of action by the client/guardian.
7. The concept that the release form can be refuted at any time even during the procedure.
8. The concept that the client/guardian recognizes that a Doctor who is scheduled to perform a procedure may be changed before or during the procedure.
9. Ensuring that the client/guardian knows the reason for the procedure.
10. Ensuring that the client/guardian knows exactly what will occur during the procedure.
11. Ensuring that the client/guardian understands the medical and or psychological risks of the procedure.
12. Ensuring that the client/guardian knows the risks of refusing to go ahead with the procedure.
13. Extensive verification that the client/guardian has been properly identified, and informed about a medical procedure, both read and heard the explanations, heard and read it in their language of maximum competence and acknowledged their hearing and or seeing (reading) the information with comprehension by use of a documented testing program.
14. When the release form includes an agreement to mandatory arbitration, the system further ensures the comprehension of the signator.

Figure 6:
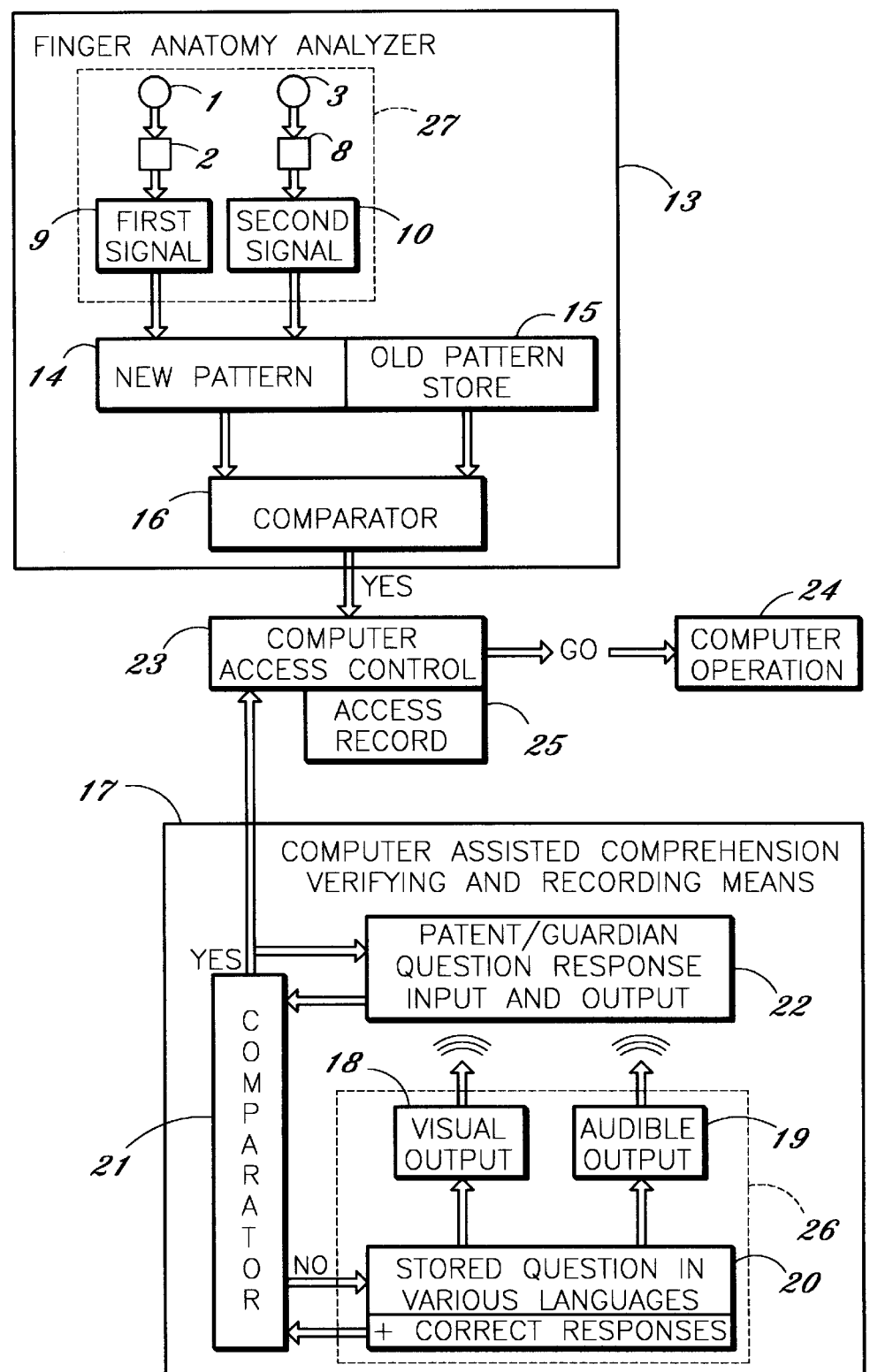
FIG. 6 is a block diagram of the system of the invention.

Referring now to FIG. 6, the system of the invention is disclosed in block diagram form as follows:

A system for verifying identity of a person and comprehension of information by said person, the system comprising:

(A) a finger anatomy analyzer 13 having a first roller 1 rotating about a fixed axis;

a second roller 3 rotatably mounted on a movable axis parallel to said fixed axis;

said first and second rollers adapted for rotatably receiving a finger passing therebetween such that rotation of said first roller reflects distance along the surface of the finger, and movement of said second roller toward and away from said first roller reflects variation in the thickness of the finger;

a first transducer 2 operatively connected to said first roller, said first transducer providing a first electrical output signal 9 reflecting distance along the surface of the finger by degrees of rotation of said first roller while rolling along said finger surface;

a second transducer 8 operatively connected to said movable axis, said second transducer providing a second electrical output signal 10 reflecting thickness of the finger;

said first and second output signals being employed in combination to provide a pattern 14 characteristic of a particular finger anatomy;

and comparator means 16 for comparing said pattern with at least one stored pattern 15 for testing correspondence therewith to thereby verify by finger anatomy the identity of said person;

(B) comprehension verifying and recording means 17 for ensuring that said person comprehends information given and responds with an informed response for recording thereof, said comprehension verifying and recording means comprising:

visual or audible computer assisted means 21 for determining a language comprehended by said person;

visual 18 or audible 19 computer assisted means for conveying said information to said person in said language;

visual or audible computer assisted means 26 for asking questions of said person in said language, said questions 20 for verifying that said person comprehends said information;

computer assisted means for recording responses to said questions 22 to thereby provide a record verifying that said person comprehended said information; and (C) means 23 for combining finger anatomy verification of identity of said person with verification that said person comprehended said information to thereby provide a verified informed response record 25 for access to a computer 24.

In an alternative embodiment of the invention, the finger engaging and signalling apparatus may be provided in a separate hardware module 27, shown in phantom in FIG. 6.

The signal and data processing of signals from module 27 and comprehension verification means, i.e. the balance of the elements of FIG. 6, may be provided by the computer to which access is to be provided. Verification then acts much like a password to gain access to other computer functions.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A system for verifying identity of a person and comprehension of information by said person, the system comprising:

(A) a finger anatomy analyzer comprising:

a first roller rotating about a fixed axis;

a second roller rotatably mounted on a movable axis parallel to said fixed axis;

spring bias means for forcing said movable axis toward said fixed axis;

said first and second rollers adapted for rotatably receiving a finger passing therebetween such that rotation of said first roller reflects distance along the surface of the finger, and movement of said second roller toward and away from said first roller reflects variation in the thickness of the finger;

a first transducer operatively connected to said first roller, said first transducer providing a first electrical output signal reflecting distance along the surface of the finger by degrees of rotation of said first roller while rolling along said finger surface;

a second transducer operatively connected to said movable axis, said second transducer providing a second electrical output signal reflecting thickness of the finger;

said first and second output signals being employed in combination to provide a pattern characteristic of a particular finger anatomy, the pattern reflecting finger width vs. distance along the finger surface;

and comparator means for comparing said pattern with at least one stored pattern for testing correspondence therewith to thereby verify by finger anatomy the identity of said person;

(B) comprehension verifying and recording means for ensuring that said person comprehends information given and responds with an informed response for recording thereof, said comprehension verifying and recording means comprising:

visual or audible computer assisted means for determining a language comprehended by said person by asking questions in various languages until a correct response is given;

visual or audible computer assisted means for conveying said information to said person in said language;

visual or audible computer assisted means for asking questions of said person in said language, said questions for verifying that said person comprehends said information;

computer assisted means for recording responses to said questions to thereby provide a record verifying that said person comprehended said information; and (C) means for combining finger anatomy verification of identity of said person with verification that said person comprehended said information to thereby provide a verified informed response record.

2. The system according to claim 1, in which said informed response record is a medical informed consent.

3. The system according to claim 1, further comprising computer access means for controlling access to a computer, said access means operatively connected to said finger anatomy analyzer and said comprehension verifying means to ensure identity of a person seeking access thereto.

4. A system for verifying the identity of a person, the system comprising:

(A) a finger anatomy analyzer comprising:

a first roller rotating about a fixed axis;

a second roller rotatably mounted on a movable axis parallel to said fixed axis;

spring bias means for forcing said movable axis toward said fixed axis;

said first and second rollers adapted for rotatably receiving a finger passing therebetween such that rotation of said first roller reflects non-linear distance along the surface of the finger and movement of said second roller toward and away from said first roller reflects variation in the thickness of the finger;

a first transducer operatively connected to said first roller, said first transducer providing a first electrical output signal reflecting distance along the surface of the finger by degrees of rotation of said first roller while rolling along said finger surface;

a second transducer operatively connected to said movable axis, said second transducer providing a second electrical output signal reflecting thickness of the finger;

said first and second output signals being employed in combination to provide a pattern characteristic of a particular finger anatomy, the pattern reflecting finger width vs. distance along the finger surface;

(B) storage means for storing said pattern; and (C) comparator means for comparing said pattern with at least one stored pattern for testing correspondence therewith.

5. The system according to claim 4, further comprising computer access means for controlling access to a computer, said access means operatively connected to said comparator means to ensure identity of a person seeking access to a computer.

* * * * *